(12) United States Patent
Agrawal et al.

(10) Patent No.: US 9,141,808 B1
(45) Date of Patent: Sep. 22, 2015

(54) DATA LOSS PREVENTION

(75) Inventors: Mukund Agrawal, Pune (IN); Sumit Kumar, Pune (IN); Anindya Banerjee, Pune (IN); Anirban Mukherjee, Pune (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 429 days.

(21) Appl. No.: 12/916,193

(22) Filed: Oct. 29, 2010

(51) Int. Cl.
*G06F 21/60* (2013.01)

(52) U.S. Cl.
CPC ........ *G06F 21/60* (2013.01); *G06F 2221/2141* (2013.01)

(58) Field of Classification Search
CPC .......... G06F 3/0637; G06F 2221/2145; G06F 17/30091; G06F 21/60; G06F 2221/2141
USPC .......................................................... 726/27
See application file for complete search history.

(56) References Cited

U.S. PATENT DOCUMENTS

| | | | |
|---|---|---|---|
| 5,452,460 A * | 9/1995 | Distelberg et al. ............ | 719/321 |
| 7,555,482 B2 | 6/2009 | Korkus | |
| 7,606,801 B2 | 10/2009 | Faitelson et al. | |
| 8,239,925 B2 | 8/2012 | Faitelson et al. | |
| 2002/0169781 A1* | 11/2002 | Poole et al. ................... | 707/100 |
| 2003/0061482 A1* | 3/2003 | Emmerichs .................. | 713/165 |
| 2004/0003289 A1* | 1/2004 | Bhogal et al. ................ | 713/201 |
| 2004/0107342 A1* | 6/2004 | Pham et al. ................... | 713/165 |
| 2005/0076390 A1* | 4/2005 | Klausberger et al. ......... | 725/134 |
| 2005/0102534 A1* | 5/2005 | Wong ............................ | 713/201 |
| 2006/0259948 A1* | 11/2006 | Calow et al. ...................... | 726/1 |
| 2006/0288404 A1* | 12/2006 | Kirshnan et al. .................. | 726/5 |
| 2007/0016771 A1* | 1/2007 | Allison et al. ................ | 713/165 |
| 2007/0094471 A1* | 4/2007 | Shaath et al. ................. | 711/163 |
| 2008/0016077 A1* | 1/2008 | Kao et al. .......................... | 707/9 |
| 2008/0229428 A1* | 9/2008 | Camiel ........................... | 726/27 |
| 2009/0063869 A1* | 3/2009 | Kohavi et al. ................. | 713/189 |
| 2009/0158430 A1* | 6/2009 | Borders .......................... | 726/23 |
| 2009/0232300 A1* | 9/2009 | Zucker et al. .................... | 380/2 |
| 2009/0254572 A1* | 10/2009 | Redlich et al. .................. | 707/10 |

OTHER PUBLICATIONS

Kollmann, Franz, Realizing fine-granular Read and Write Rights on Tree Structured Documents, Apr. 2007, The Second International Conference on Availability, Reliability and Security, pp. 517-523.*
www.http://dlc.sun.com/osol/docs/content/TRSSUG/ugintro-14.html, Dec. 2008.

* cited by examiner

*Primary Examiner* — Kenneth Chang
(74) *Attorney, Agent, or Firm* — Campbell Stephenson LLP

(57) ABSTRACT

Data loss prevention systems and methods begin protecting data upon the creation of the data. One such method involves detecting a file system operation targeting data on a storage device. The file system operation creates or modifies the data or a set of permissions associated with the data. In response to detecting the file system operation, the method prevents unauthorized access to the data. The method begins preventing unauthorized access after the detection of the file system operation and before any subsequent read access to the data via the file system.

21 Claims, 4 Drawing Sheets

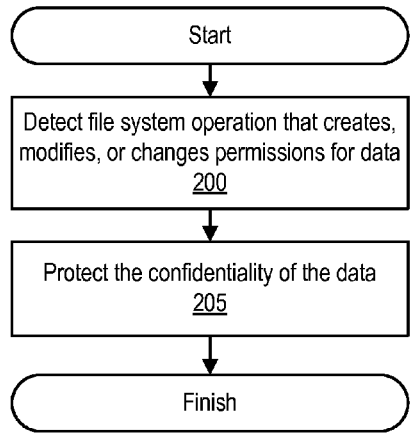
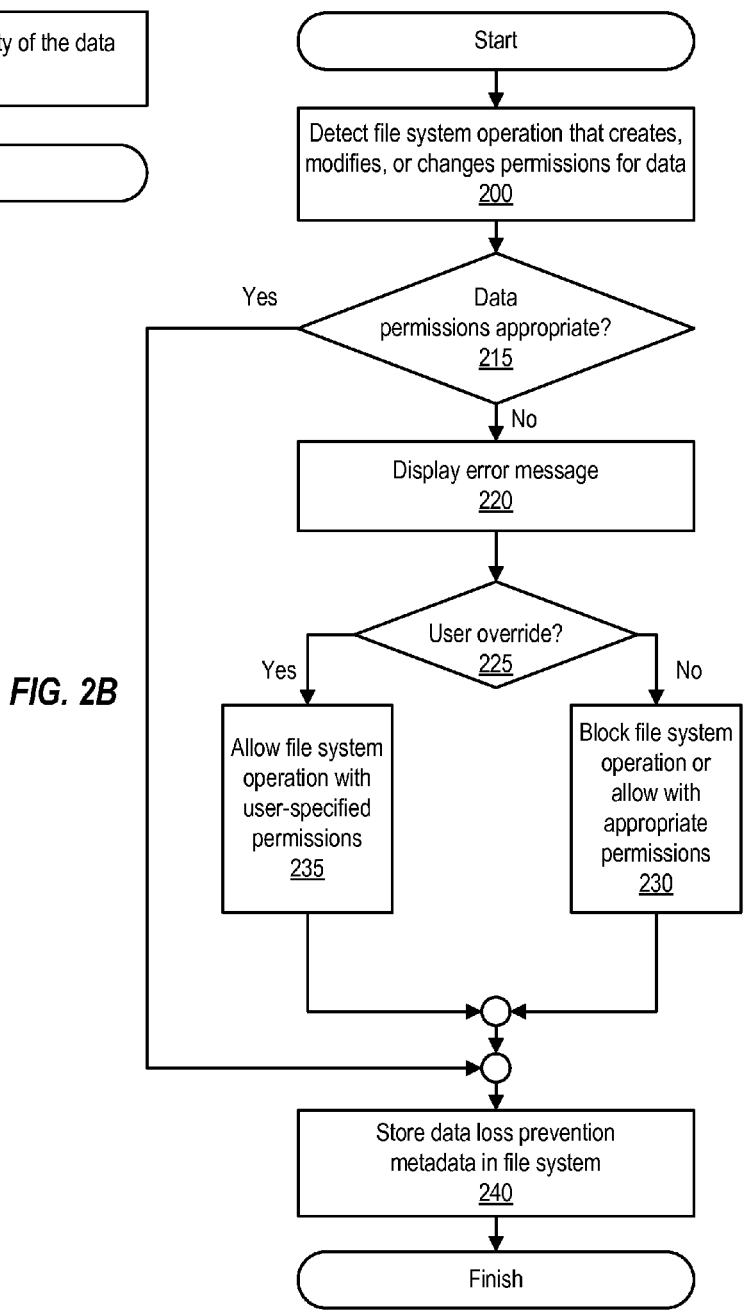

DATA LOSS PREVENTION

FIELD OF THE INVENTION

This invention relates to the data loss prevention.

DESCRIPTION OF THE RELATED ART

Data loss prevention systems are used to maintain the confidentiality of data by preventing unauthorized access to data. Data loss prevention systems typically operate by scanning an existing data store to identify potentially confidential data and then subsequently protecting the identified confidential data. Unfortunately, in existing data loss prevention systems, the confidentiality of data may be compromised before that data is identified as being confidential by the data loss prevention system.

SUMMARY OF THE INVENTION

Various systems and methods for providing a data loss prevention system that begins protecting data upon the creation of the data are disclosed. One such method involves detecting a file system operation targeting data on a storage device. The file system operation creates or modifies the data or a set of permissions associated with the data. In response to detecting the file system operation, the method prevents unauthorized access to the data. The method begins preventing unauthorized access after the detection of the file system operation and before any subsequent read access to the data via the file system.

In one embodiment, preventing unauthorized access to the data involves requesting that a data loss prevention processor process the data and setting one or more permissions for the data, based upon an outcome of the data loss prevention processor's processing of the data.

In another embodiment, preventing unauthorized access to the data involves displaying an error message to a user that initiated the file system operation. The error message is displayed in response to detecting that the user specified a permission for the data that is more permissive than determined by a data loss prevention processor. The method can also receive input from the user verifying the permission, subsequent to displaying the error message.

In yet other embodiments, preventing unauthorized access to the data can involve preventing creation of the data on the shared storage device. Alternatively, this act can be performed by encrypting the data until a user closes a file that includes the data.

In some embodiments, the method can also involve generating metadata associated with the data. The metadata is generated by a data loss prevention system. The method then stores the metadata in such a manner that the metadata is accessed each time the data is accessed via the file system. The metadata can identify a data loss prevention system callback routine in some embodiments.

In one embodiment, the data is included in a file. The file includes multiple data streams. The metadata can be stored in one of those data streams.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIGS. 2A and 2B are flowcharts of methods of preventing data loss, according to embodiments of the present invention.

Figure 1:
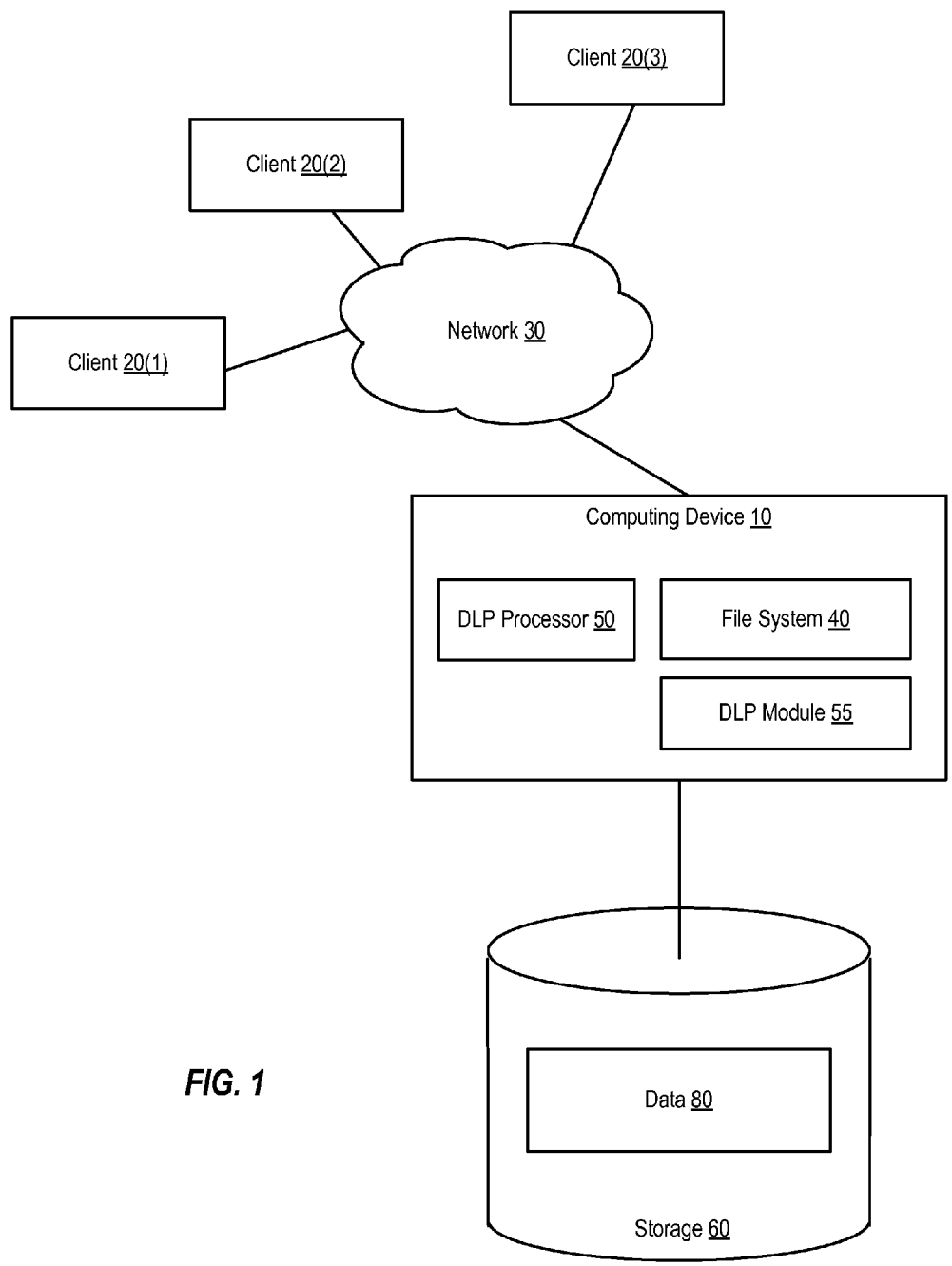
FIG. 1 is a block diagram of a data loss prevention system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

In order to guarantee that all data is protected, a data loss prevention system monitors creative activity (e.g., activity that creates data, such as writes and file creation) and activity that affects existing permissions. In response to detecting such activity, the data loss prevention system controls access to the data targeted by the activity, such that no unauthorized access to that data can occur. Accordingly, the data loss prevention system minimizes the time that the data is left unprotected subsequent to the time at which the data is created or modified. The data loss prevention system can also include metadata relating to data loss prevention either with the data itself (e.g., in a data stream within a file) or within file system metadata associated with the data. In such situations, the metadata will be accessed, and potentially processed by, the data loss prevention system each time the associated data is accessed by the file system.

FIG. 1 is a block diagram of a computing system that supports data loss prevention. In particular, this system includes a data loss prevention module that monitors file system activity in order to control access to newly created and modified data. This system protects data "at rest" (i.e., being stored) within the system, such as data 80 in storage 60, from unauthorized access.

The computer system of FIG. 1 includes a computing device 10 that is coupled to several client computing devices 20(1), 20(2), and 20(3) (collectively, clients 20) by network 30. Computing device 10 and client computing devices 20(1), 20(2), and 20(3) can each include any of a variety of different types of computing devices, including servers, personal computing devices, laptop computers, net books, personal digital assistants, cellular phones, or the like.

Clients 20 are each configured to allow users (e.g., humans and/or applications) to access data 80 stored on shared storage 60 via a file system 40 implemented on computing device 10. File system 40 organizes data 80 (e.g., into directories and files), maps the location of data 80 to an underlying storage device, and maintains data 80 by controlling access (e.g., create, read, and write operations) to the data by applications on clients 20.

Storage 60 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Storage device 60 may also (or alternatively) include an array of such storage devices.

Computing device 10 implements a data loss prevention (DLP) processor 50, which is configured to process data and/or metadata associated with the data and, based on the results of this processing, determine what the proper permissions to access that data should be in order to maintain the confidentiality of the data. The permissions can specify which users and/or groups have permission to perform each of several types of access (e.g., reading and writing) to a particular item of data (e.g., a file). For example, a permission associated with a file can indicate that each of several groups of users is allowed to read the file, but that only users in a single one of those groups is allowed to write to the file.

Computing device 10 also includes a DLP module 55, which operates to detect certain types of file system operations and, in response, to trigger DLP processing of data targeted by the detected file system operations. In some embodiments, DLP module 55 can additionally prevent completion of the detected file system operations (e.g., where completion involves the file system's performing the file system operation to storage 60 and signaling completion of the file system operation to a requesting application). DLP module 55 can be implemented as a driver (e.g., a file system filter driver) that sits beneath the file system, or as part of the file system itself. DLP module 55 can be configured to detect file system operations that create files, file system operations that modify and/or create data within a file, and file system operations that modify permissions associated with a file. In some embodiments, DLP module 55 can be configured to also detect file system operations that read files.

As noted above, DLP processor 50 processes data in order to determine what the appropriate permissions should be for that data. The processing can involve scanning the contents of the data (e.g., looking for certain keywords or phrases, looking for data that appears to be a salary or social security number, looking for data that appears to be a personnel document, and the like), identifying the creator of the data, and the like. For example, if an employee with a security clearance creates a new file that contains the phrase "confidential" in its file name, DLP processor 50 can determine that the permissions for the new file should restrict access to only employees who have at least the same security clearance as the employee.

In one embodiment, DLP module 55 is configured to notify (e.g., by generating an interrupt or sending a message) DLP processor 50 whenever a particular file system operation is detected. DLP module 55 can also pass the data (e.g., as temporarily stored in a data buffer) affected by the file system operation to DLP processor 50 for scanning and other processing.

DLP processor 50 processes the data and determines whether the data is confidential. If multiple classifications of confidential data are available (e.g., top secret, sensitive, and the like), DLP processor 50 determines which classification applies to the data.

Once DLP processor 50 has identified the appropriate classification for the data, DLP processor 50 determines the appropriate data permissions to apply to data having that classification. This determination can be based upon a set of rules maintained by the DLP processor 50. Such rules can be preconfigured, specified by users during run time, or some combination of both. Additionally, DLP processor 50 can be configured to "learn" new rules over time, based upon user input. DLP processor 50 then compares these appropriate data permissions to the data permissions currently applied (or being requested, if the detected file system operation changes the data's permissions) to the data. If the two sets of permissions are equal, or if the data permissions currently applied (or being requested) are more restrictive than the appropriate data permissions, DLP processor 50 can notify DLP module 55 that the file system operation should be allowed to proceed.

If the two sets of permissions are not equal and the currently-applied permissions are less restrictive than the appropriate permissions, DLP processor 50 can notify DLP module 55 of the discrepancy. In response to this notification, DLP module 55 will take action to ensure that the confidentiality of the data is protected, such that there is not a window of time, subsequent to detection of the file system operation, during which the data can be read or otherwise accessed by an unauthorized user.

In some embodiments, in order to protect the data, DLP module 55 will modify the permissions to equal the more restrictive set of permissions determined to be appropriate by DLP processor 50. In other embodiments, DLP module 55 will simply prevent the file system operation from being performed.

In other embodiments, DLP module 55 will protect the data by causing an error message to be displayed to a user. For example, if a user of a document editing program running on client 20(1) attempts to write data to a new file, the error message can say that the user appears to be creating confidential data containing a social security number but is granting all users permission to access the potentially confidential data. In response to this error message, the user can be prompted to accept the permissions proposed by the DLP system, to retry the operation, or to specifically override these permissions. In the latter situation, the DLP system can log (e.g., by storing information describing) the override for later analysis. It is noted that, in some situations, the DLP system may not allow certain overrides (e.g., if data is top secret, the DLP system may not allow a user to make that data accessible to everyone).

In general, if the permissions determined to be appropriate by the DLP processor are more restrictive than those specified by the user, indicating that one of the DLP rules is violated, then any one or more of a variety of different actions can be taken. For example, if the data is determined to be top secret but does not have corresponding permissions, the DLP system (e.g., the DLP processor and DLP module) can prevent the file system operation from being performed until the permissions are corrected or a new rule is created allowing the existing permissions (e.g., in response to a user override). As another example, if data is highly confidential, the DLP system can simply prevent gross violations of the rules by not allowing all users to access the data but perhaps allowing other users in the same user group and/or department to access the data. If the data is determined to be confidential but with a lesser degree of confidence, and if the user-specified permissions are broad, the DLP system can allow the file system operation, but immediately notify the user who is initiating the file system operation about a potential confidentiality breach (e.g., by displaying an error message to the user). If the data targeted by the file system operation does not appear to be confidential, the DLP system can simply insert an entry corresponding to the file system operation into a log. If the data is not determined to be confidential, any user-specified permissions can be allowed.

In some embodiments, in order to avoid having a significant negative impact on write performance, the DLP system can temporarily protect data affected by a file system operation that modifies the data or its permissions by encrypting the data. When the file containing the data is subsequently closed, the DLP system can then proceed to decrypt and process all of the data in the file (or at least all of the modified data in the file) in a manner similar to that described above in order to determine the appropriate permissions for the data and ensure that those permissions are applied (or specifically overridden by a user, in response to that user viewing an error message corresponding to the permissions).

If the data is encrypted or otherwise encoded before being written, the DLP module 55 can track the encrypted data for later processing by DLP processor 50. To track the encrypted data, DLP module 55 can generate information such as the filename of a file containing the encrypted data, the offset at which the data is stored, a length of the data, and the like, and add this information to a list of data items (e.g., files) that need further processing. If the data is determined to be confidential, the DLP system may determine that the data should be kept in encrypted and/or encoded form. The DLP system may also generate an alert requesting further action (e.g., the revocation of certain permissions for the data) from an administrator. When the data is subsequently processed and the DLP system ensures that no confidential data is being exposed from that item of data, the data can be decrypted and removed from the list of data items that need further processing. Until the data has been fully processed, only the user and application used to create the data will be able to access the data. To allow this access, the DLP system will decrypt or otherwise decode the data in-memory and serve the data to the user via the file system.

Instead of encrypting the data, DLP module 55 can alternatively obtain a mandatory lock on the file regions and/or the buffers containing the data targeted by the file system operation. DLP module 55 can release this lock only when the data is scanned by the DLP processor 50 and DLP processor 50 determines that the data's permissions will not result in the exposure of any confidential data.

In other embodiments, whenever any new data is created via a file system operation, DLP module 55 saves the new data's actual permissions at temporary location. The DLP module 55 then causes the data item to be created with minimal set of permissions that only allow the user and/or application that created the data to access the data. Once the DLP processor 50 has scanned the file, DLP module 55 can restore the original permissions, if deemed appropriate by the scan.

When the DLP processor 50 detects that data is confidential data, DLP processor 50 can update a corresponding rule to indicate that the permissions associated with that data can no longer be changed. Thus, even if some user accidentally tries to modify the permissions (especially to less restrictive permissions), that user will only see an error. Additionally, if the rule is updated by setting a file attribute for the file containing the data, the attribute will be preserved, even if the file is copied to another system that lacks DLP module 55 and DLP processor 50.

In some embodiments, the DLP system protects data by storing metadata associated with the data via the file system. This metadata could be used to temporarily restrict access to data (e.g., between the time the data is created, as detected by DLP module 55, and the time that the data is actually processed by DLP processor 50). This information could be stored within an Mode structure corresponding to a file containing the data. Alternatively, if the file contains multiple data streams, this metadata could be stored within a named data stream within the file. The metadata could include the result of the last DLP scan on the data to determine its confidentiality, the organization category (e.g., business, finance, sensitive, and the like) associated with the user who created the data, and/or the rules associated with the data (e.g., used to determine what permissions are appropriate for that file).

Additionally, such metadata (again, stored in a data stream or Mode structure) can be used to register file system callbacks for the data. This metadata can be detected by DLP module 55 and/or file system 40 each time the data is accessed, and DLP module 55 and/or file system 40 can trigger the appropriate DLP action, based upon the callback (s) associated with the data. Callbacks are DLP system routines that can be performed when a registered file system operation (e.g., access, delete, modify, and the like) is performed on the data. Examples of DLP callback routines that can be triggered by the performance of a file system operation upon a file include: scanning the data to determine its confidentiality; retrieving and/or updating the result of a DLP scan; generating an alert or other notification to an administrator whenever a file having a particular set of permissions is accessed; encrypting or obtaining a lock on the file (e.g., to protect the data within the file prior to the file being scanned by the DLP system, as described above); and denying access to a file. Registering a callback can involve storing information identifying the file system operation(s) that trigger the callback routine and information identifying the particular callback routine to be performed when the file system operation is performed on the data.

DLP module 55 can store this metadata with the data as the data is being written, or can store this metadata at other times when the data is being accessed (e.g., if the data is subsequently read in order to be rescanned by the DLP processor). As described above, this metadata can be used to ensure a higher level of confidentiality for certain data than would otherwise be provided by its permissions.

Unlike preexisting DLP solutions, the system shown in FIG. 1 is configured to begin protecting data as that data is created. In contrast, preexisting systems wait to protect data until the next periodic scan of the data, such that the data is unprotected between the time that the data is created and the time that the data is scanned. Leaving such a window of time in which data is unprotected can allow unauthorized access to the data or the creation of uncontrolled copies of data. Such unauthorized accesses during the exposure window could include the contents of storage 60 being replicated to a remote site, being indexed by a desktop search tool, being backed up during the exposure window, or being part of a mirrored storage configuration.

FIG. 1 shows an example of a situation in which DLP processor 50, DLP module 55, and file system 40 are implemented separately. In other embodiments, these modules can be integrated within the same software product. In still other embodiments, all or some of these modules may be clustered modules operating cooperatively on multiple computing devices. In yet other alternative embodiments, DLP processor 50 can be implemented on a different computing device than DLP module 55.

FIG. 2A is a flowchart of a method of preventing data loss. This method can be performed by a DLP module (e.g., similar to DLP module 55 of FIG. 1) operating in conjunction with a DLP processor (e.g., similar to DLP of FIG. 2).

The method begins at 200, when a DLP module detects a file system operation that creates, modifies, or changes the permissions for data. In response to detecting this file system operation, the DLP module, in conjunction with a DLP processor, operates to protect the confidentiality of the data targeted by the file system operation, as shown at 205.

Performing operation 205 can involve any one or more of a variety of different operations. For example, in one embodiment, the data can be protected by preventing the file system operation from being performed if doing so would potentially expose confidential data. In other embodiments, the data can be temporarily encrypted or locked until a time (e.g., such as upon closure of a file containing the data) at which the data can be processed by the DLP system. In still other embodiments, a user can be prompted to modify the permissions set for the data in order to prevent exposure of confidential data.

FIG. 2B shows a more specific method of preventing data loss. As with the method of FIG. 2A, this method can be performed by a DLP module (e.g., similar to DLP module 55 of FIG. 1) operating in conjunction with a DLP processor (e.g., similar to DLP of FIG. 2).

The method begins at 200, when a DLP module detects a file system operation that creates, modifies, or changes the permissions for data. In response to detecting this file system operation, the DLP module, in conjunction with a DLP processor, determines whether the permissions for that data are appropriate, as shown at 215. If not, the DLP module causes an error message to be displayed to the user, indicating why the permissions were not deemed to be appropriate, as shown at 220.

The user can select whether or not to override the permissions identified by the DLP system, as shown at 225. If the user selects to override the permissions, the DLP system will allow the file system operation to be performed, with the user-specified permissions for the data, as shown at 235. The DLP system can also log this override.

While the example of FIG. 2 shows that the user can always override the permissions identified by the DLP system, other embodiments may not allow this. For example, in an alternative embodiment, the DLP system may not allow the user to perform certain types of overrides (e.g., to make top secret data available to all users). Accordingly, in some situations, certain overrides may not be allowed.

If the user selects to not override the permissions, the DLP system can either cause the file system operation to not be performed or allow the file system operation to be performed using the permissions identified by the DLP system, as shown at 230.

The DLP system can then store data loss prevention metadata associated with the data via the file system, as shown at 240. For example, this metadata can be stored in a named data stream of the file containing the data. The DLP metadata will be detected by a DLP module and/or file system the next time the data is accessed via the file system. The DLP metadata can then be processed by the DLP system in response to being detected.

The operations shown in FIGS. 2A and 2B can be repeated for each file system operation detected by a DLP module. Some operations may be omitted in certain embodiments, and other embodiments may include other operations instead of and/or in addition to those depicted in FIGS. 2A and 2B.

Figure 3:
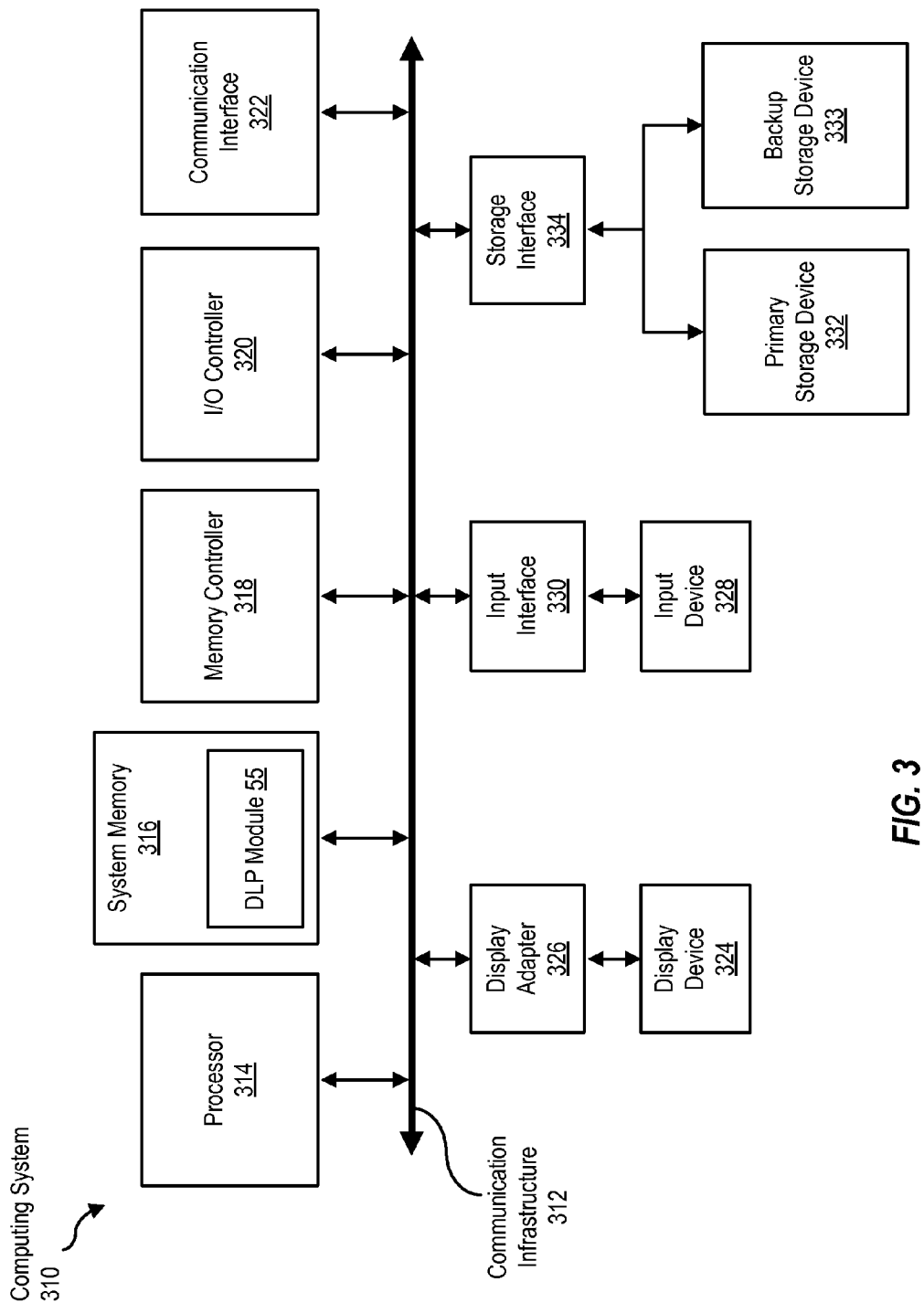
FIG. 3 is a block diagram of a computing device, illustrating how a data loss prevention module can be implemented in software, according to one embodiment of the present invention.

FIG. 3 is a block diagram of a computing system 310 capable of implementing a DLP module as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a DLP module, computing system 310 becomes a special purpose computing device that is configured to implement all or some of the data loss prevention techniques described above.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing all or some of the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. In one example, program instructions implementing a DLP module 55 may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may each include a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can be used to store file system data and metadata, as described above.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
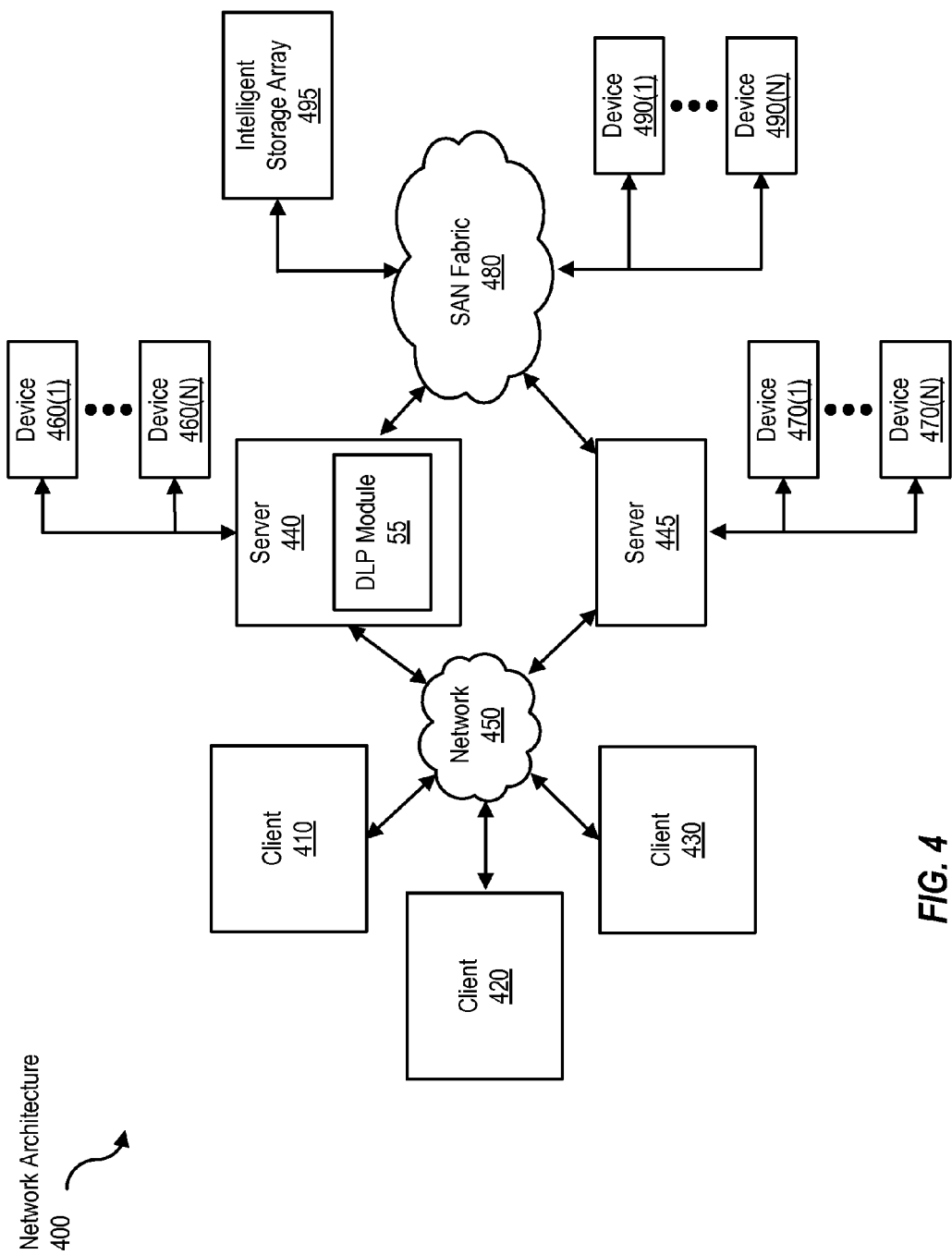
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system.

Similarly, servers 440 and 445 generally represent computing devices or systems, such as application servers or database servers implemented on a computing device such as computing system 310 in FIG. 3, configured to provide various database services and/or run certain software applications. Network 450 generally represents any telecommunication or computer network including, for example, an intranet, a wide area network (WAN), a local area network (LAN), a personal area network (PAN), or the Internet. In one example, client systems 410, 420, and/or 430 and/or servers 440 and/or 445 may include a DLP module 55 as shown in FIGS. 1 and 3.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS).

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 3, may be used to provide connectivity between each client systems 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of the computing devices in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a DLP module 55 in FIG. 1, acting in conjunction with a DLP processor, may transform behavior of a computing device in order to cause the computing device to begin protecting potentially confidential data as soon as that data is created.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    detecting a file system operation targeting data on a shared storage device, wherein the file system operation creates or modifies the data or a set of permissions associated with the data;
    in response to the detecting, comparing the set of permissions associated with the data to a set of appropriate permissions, wherein
    the set of appropriate permissions restricts unauthorized access to the data,
    if the set of permissions associated with the data is less restrictive than the set of appropriate permissions, the set of appropriate permissions is violated, and
    when the detecting and the comparing are performed, the set of permissions associated with the data does not restrict unauthorized access to the data;
    in response to the comparing, preventing unauthorized access to the data, wherein the preventing begins after the detecting and before any subsequent read access to the data,
    the preventing comprises generating an error message in response to detecting that the set of permissions associated with the data is more permissive than the set of appropriate permissions,
    the set of appropriate permissions was determined by a data loss prevention (DLP) processor, and
    the error message indicates that the set of appropriate permissions proposed by the DLP processor can be accepted, the file system operation can be retried, or the set of permissions associated with the data can be overridden.

2. The method of claim 1, wherein the preventing unauthorized access to the data further comprises:
    requesting that the data loss prevention processor process the data; and
    modifying the set of permissions to restrict unauthorized access to the data, based upon an outcome of the data loss prevention processor's processing of the data.

3. The method of claim 2, wherein the preventing further comprises displaying an error message to a user, wherein the user initiated the file system operation, and wherein the displaying is performed in response to detecting that the user specified a set of permissions for the data that is more permissive than determined by the DPL processor.

4. The method of claim 3, further comprising receiving input verifying the set of permissions, subsequent to displaying the error message.

5. The method of claim 1, wherein the preventing further comprises preventing creation of the data on the shared storage device.

6. The method of claim 1, wherein the preventing further comprises encrypting the data until a user closes a file comprising the data.

7. The method of claim 1, further comprising:
generating metadata associated with the data, wherein the metadata is generated by the DLP processor; and
storing the metadata, wherein the metadata is accessed each time the data is accessed.

8. The method of claim 7, wherein a file comprises the data, wherein the file comprises a plurality of data streams, and wherein the metadata is stored in one of the plurality of data streams.

9. The method of claim 7, wherein the metadata identifies a DLP processor system callback routine.

10. A non-transitory computer readable storage medium storing program instructions executable to:
detect a file system operation targeting data on a shared storage device, wherein the file system operation creates or modifies the data or a set of permissions associated with the data;
in response to detection of the file system operation, compare the set of permissions associated with the data to a set of appropriate permissions, wherein the set of appropriate permissions restricts unauthorized access to the data, if the set of permissions associated with the data is less restrictive than the set of appropriate permissions, the set of appropriate permissions is violated, and
when the file system operation is detected and the set of permissions is compared, the set of permissions associated with the data does not restrict unauthorized access to the data; and
in response to the comparison, prevent unauthorized access to the data, wherein the prevention of the unauthorized access begins after the detection of the file system operation and before any subsequent read access to the data,
the prevention comprises generation of an error message in response to detection that the set of permissions associated with the data is more permissive than the set of appropriate permissions,
the set of appropriate permissions was determined by a data loss prevention (DLP) processor; and
the error message indicates that the set of appropriate permissions determined by the DLP processor can be accepted, the file system operation can be retried, or the set of permissions associated with the data can be overridden.

11. The non-transitory computer readable storage medium of claim 10, wherein the program instructions executable to prevent unauthorized access to the data further comprise instructions executable to:
request that the DLP processor process the data; and
modify the set of permissions to restrict unauthorized access to the data, based upon an outcome of the DLP processor's processing of the data.

12. The non-transitory computer readable storage medium of claim 11, wherein the program instructions executable to prevent unauthorized access to the data further comprise instructions executable to: display an error message to a user, wherein the user initiated the file system operation, and wherein the error message is displayed in response to detection that the user specified a set of permissions for the data that is more permissive than determined by the DLP processor.

13. The non-transitory computer readable storage medium of claim 10, wherein the program instructions are further executable to:
generate metadata associated with the data, wherein the metadata is generated by the DLP processor; and
store the metadata, wherein the metadata is accessed each time the data is accessed via the file system.

14. The non-transitory computer readable storage medium of claim 13, wherein a file comprises the data, wherein the file comprises a plurality of data streams, and wherein the metadata is stored in one of the plurality of data streams.

15. The non-transitory computer readable storage medium of claim 13, wherein the metadata identifies a DLP processor callback routine.

16. A system comprising:
one or more processors; and
a memory coupled to the one or more processors, wherein the memory stores program instructions executable by the one or more processors to:
detect a file system operation targeting data on a shared storage device, wherein the file system operation creates or modifies the data or a set of permissions associated with the data;
in response to detection of the file system operation, compare the set of permissions associated with the data to a set of appropriate permissions, wherein the set of appropriate permissions restricts unauthorized access to the data, if the set of permissions associated with the data is less restrictive than the set of appropriate permissions, the set of appropriate permissions is violated, and
when the file system operation is detected and the set of permissions is compared, the set of permissions associated with the data does not restrict unauthorized access to the data; and
in response to the comparison, prevent unauthorized access to the data, wherein the prevention of the unauthorized access begins after the detection of the file system operation and before any subsequent read access to the data,
the prevention comprises generation of an error message in response to detection that the set of permissions associated with the data is more permissive than the set of appropriate permissions,
the set of appropriate permissions was determined by a data loss prevention (DLP) processor, and
the error message indicates that the set of appropriate permissions determined by the DLP processor can be accepted, the file system operation can be retried, or the set of permissions associated with the data can be overridden.

17. The system of claim 16, wherein the program instructions executable to prevent unauthorized access to the data further comprise instructions executable to:
request that the DLP processor process the data; and
modify the set of permissions to restrict unauthorized access to the data, based upon an outcome of the DLP processor's processing of the data.

18. The system of claim 17, wherein the program instructions executable to prevent unauthorized access to the data further comprise instructions executable to: display an error message to a user, wherein the user initiated the file system operation, and wherein the error message is displayed in response to detection that the user specified a set of permissions for the data that is more permissive than determined by the DLP processor.

19. The system of claim 16, wherein the program instructions are further executable to:
   generate metadata associated with the data, wherein the metadata is generated by the DLP processor; and
   store the metadata, wherein the metadata is accessed each time the data is accessed via the file system.

20. The system of claim 19, wherein a file comprises the data, wherein the file comprises a plurality of data streams, and wherein the metadata is stored in one of the plurality of data streams.

21. The system of claim 19, wherein the metadata identifies a DLP processor callback routine.

* * * * *

UNITED STATES PATENT AND TRADEMARK OFFICE
CERTIFICATE OF CORRECTION

| | |
|---|---|
| PATENT NO. | : 9,141,808 B1 |
| APPLICATION NO. | : 12/916193 |
| DATED | : September 22, 2015 |
| INVENTOR(S) | : Mukund Agrawal et al. |

It is certified that error appears in the above-identified patent and that said Letters Patent is hereby corrected as shown below:

In the Claims

Column 13
Line 3, in Claim 3, replace: "DPL" with -- DLP --
Line 23, in Claim 9, replace: "processor system" with -- processor --

Column 14
Line 63, in Claim 18, replace: "wherein wherein the program" with -- wherein the program --

Signed and Sealed this
Twelfth Day of July, 2016

Michelle K. Lee
*Director of the United States Patent and Trademark Office*